March 14, 1933. F. A. SMITH 1,901,613
SPARE WHEEL CARRIER AND LOCK
Filed July 2, 1931 2 Sheets-Sheet 1
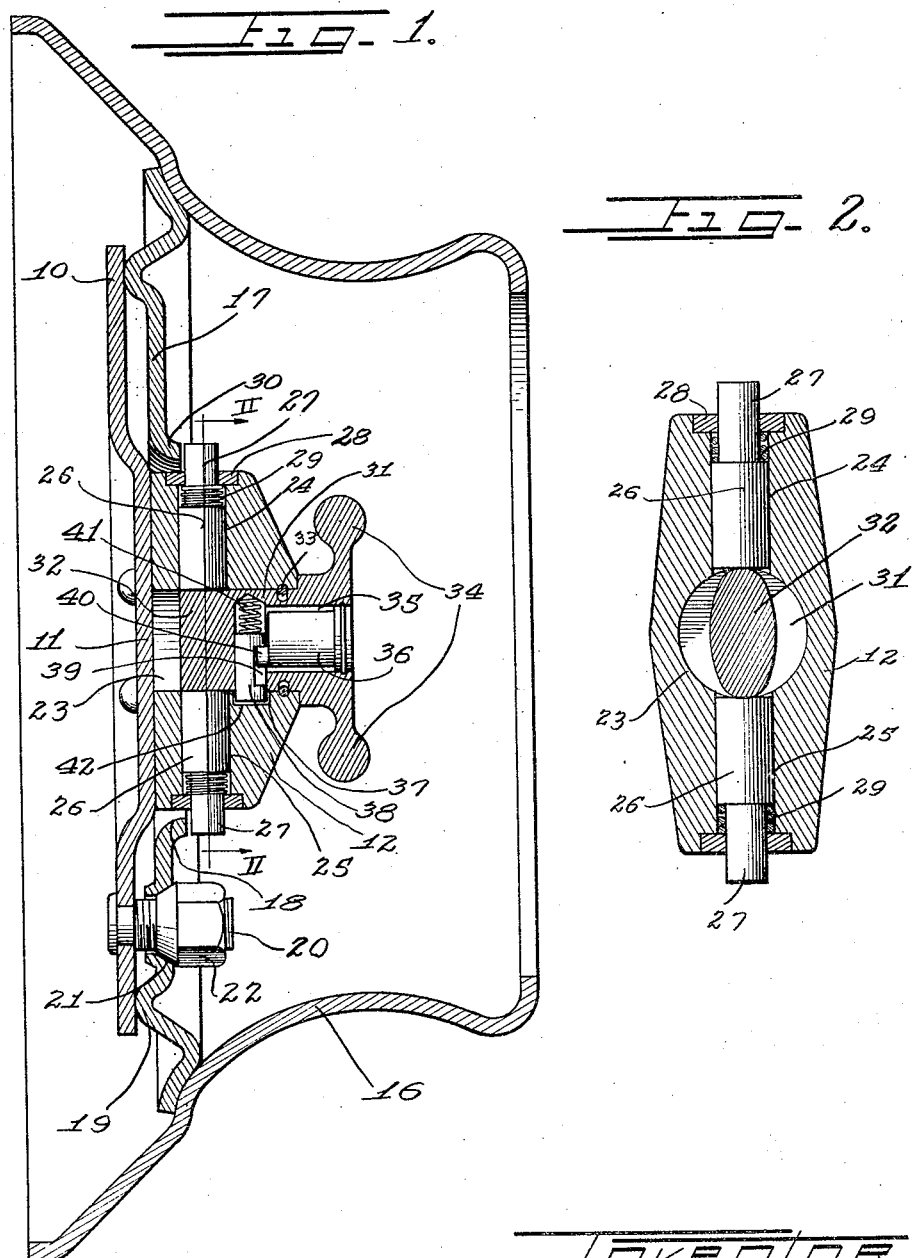
Inventor
Frederick A. Smith.
by:

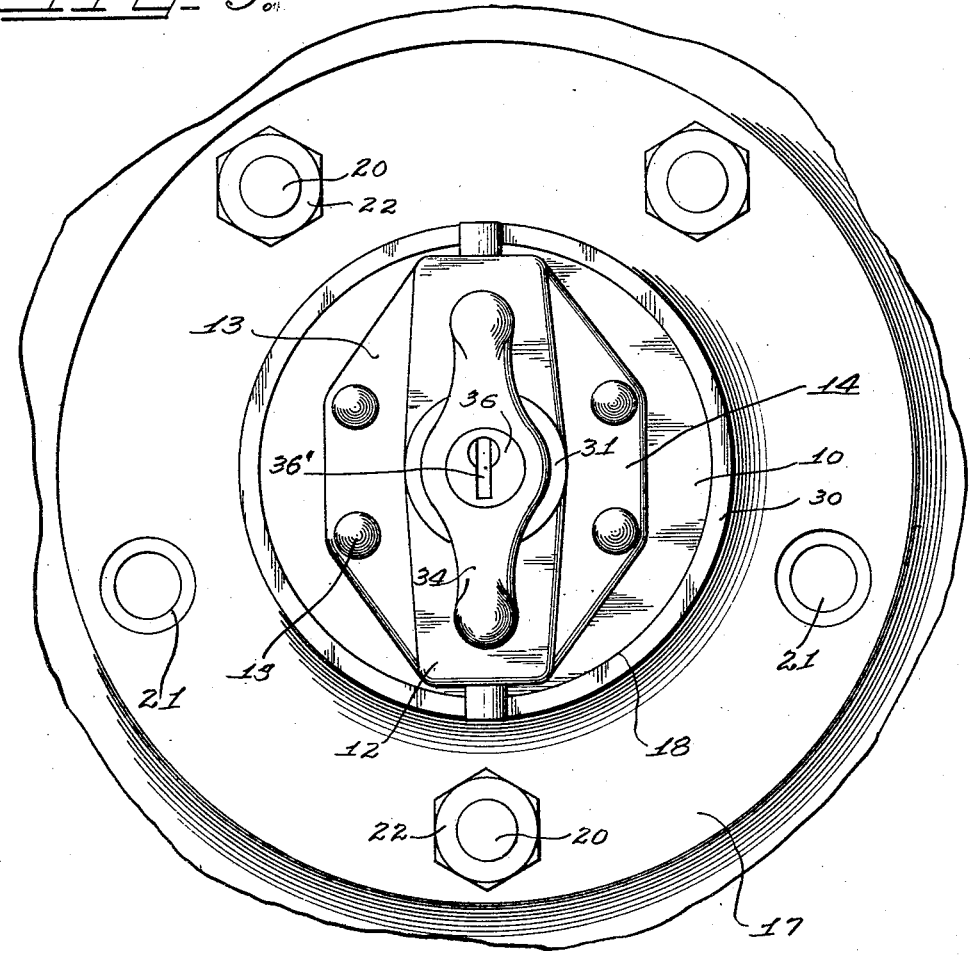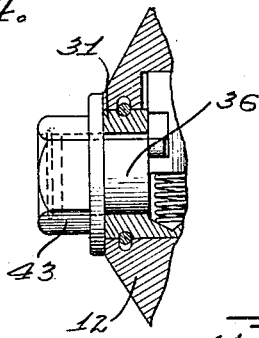

Patented Mar. 14, 1933

1,901,613

UNITED STATES PATENT OFFICE

FREDERICK A. SMITH, OF NORTH CHICAGO, ILLINOIS, ASSIGNOR TO OAKES PRODUCTS CORPORATION, OF NORTH CHICAGO, ILLINOIS, A CORPORATION OF MICHIGAN

SPARE WHEEL CARRIER AND LOCK

Application filed July 2, 1931. Serial No. 548,397.

This invention relates to a spare wheel carrier and improved locking means for locking a wheel thereto.

The invention concerns particularly a carrier structure for receiving the hub of a spare wheel together with locking means for locking the hub and thereby the wheel on the carrier.

An important object of the invention is to provide latch members for interlocking a wheel hub with the carrier together with a manually operable cam member for the latch member and key-controlled locking means for locking the cam member in locking position.

The various features of my invention are incorporated in the structure shown on the drawings, in which drawings Figure 1 is a vertical diametral section of a carrier support and a wheel hub thereon;

Figure 2 is an enlarged section on plane II—II of Figure 1;

Figure 3 is a front elevation of the carrier and part of the wheel hub thereon; and Figure 4 is a fragmentary view in section showing a modified locking arrangement.

The carrier structure shown comprises a circular disc 10 having the central forward deflection 11 forming a seat for a head 12 having the side flanges 13 and 14 by which it is rigidly secured to the seat as by means of rivets 15.

I have shown the hub 16 of a spare wheel, the inner wall 17 of the hub having the central opening 18 for receiving the carrier head 12, the wall 17 having the rearwardly extending annular ridge 19 for seating against the carrier disc 10 to vertically align the wheel. The carrier disc 10 has one or more bolts 20 extending forwardly therefrom which are spaced in accordance with the bolt holes 21 in the hub wall 17 which holes receive the bolts which secure the wheel to the hub on the vehicle. When the wheel is applied to the carrier, the bolts 20 will extend through the respective holes 21 and then nuts 22 are applied to the bolts to secure the wheel hub to the carrier disc 10 against rotational or lateral displacement.

To guard against theft of the wheel from the carrier, I provide improved lock mechanisms. The head 12 has the central transverse cylindrical bore 23 from which extend the opposite radial bores 24 and 25 in each of which is slidable a cylindrical latch pin 26 having a reduced outer end 27. At its outer end each radial bore is closed by a plate or plug 28 through which the reduced end of the respective latch pin may extend, a compression spring 29 being interposed between the pin body and plug and the spring tending to shift the latch pin inwardly. When the pins are projected their reduced ends will be in front of the flange 30 surrounding the opening 18 in the inner wall of the wheel hub and removal of the wheel from the carrier will not be prevented.

Rotatable in the outer end of the bore 23 is a cylindrical hub 31 having at its inner end the cam lug 32 which is of elliptical or oval cross section and which is located between the latch pins. The hub is locked against axial movement in the bore by the annular key 33, and at its outer end it has the transverse handle or grip 34 by means of which it may be readily turned for positioning of the cam lug relative to the latch pins. When the major axis of the cam lug is in alignment with the latch pins, as shown in Figures 1 and 2, the pins will be shifted outwardly to project their ends in front of the wheel hub to lock the wheel to the carrier. When the cam lug is turned with its minor axis in alignment with the pins, the springs 29 will be free to shift the pins inwardly to withdraw the pin ends from in front of the wheel hub so that the wheel is unlocked and then when the nuts 22 are withdrawn from the bolts 20, the wheel may be removed from the carrier.

The hub 31 has at its outer end the axially extending cylindrical pocket 35 for receiving a lock cylinder 36 which is rotatable by a key inserted in the key hole 36'. Extending transversely through the hub across the inner end of the pocket 35 is the guide channel 37 for the lock detent 38 which has the notch 39 in which engages the cam end 40 of the lock cylinder so that when the lock cylinder is turned, the lock detent will be shifted. Both the locking and unlocking movement of the latch may be controlled by the turning of the lock cylinder by the key, but I have shown a compression spring 41 seated at the end of the guideway 37 and abutting against the rear end of the lock detent and tending to force the detent outwardly to project its end into the notch 42 provided in the head 12. The notch is positioned so that when the detent engages therein the cam hub will be locked to the head against rotation and with the cam lug engaging with and projecting the latch pins outwardly into locking position. By inserting the key in the lock and turning the cylinder, the lock detent will be shifted inwardly to withdraw its end from the notch 42 so that by means of the handle 34 the cam hub may be turned for release of the latch pins and inward shift thereof by the springs to release the wheel hub. When a wheel is to be locked to the carrier, it is applied thereto and then the hub 31 is turned until the lock detent snaps into the notch 42 and further turning of the hub 31 will be prevented, the cam lug then holding the latch pins shifted outwardly in locking position in front of the wheel hub.

In Figure 4 I have shown a modified arrangement. Instead of having the hub 31 terminate at its outer end in handle members, it may be terminated in a polygonal head 43 for receiving a wrench or other tool for turning of the hub for positioning the cam lug.

I have shown an efficient and practical embodiment of the features of my invention, but I do not desire to be limited thereto as changes and modifications may be made without departing from the scope of the invention as defined by the appended claim.

I claim as follows:

In a spare wheel carrier structure, the combination of a carrier plate and a head extending forwardly therefrom, said plate forming an abutment for the inner transverse wall of a wheel hub and said head being adapted to extend through an opening in such wall, said head having a bore therethrough closed at its rear end by said plate, a cam hub journalled in the front end of said bore and supporting a cam at its rear end in said bore, latch pins extending through said head for engagement by said cam to be projected to be in front of the transverse wall of a wheel hub to thereby prevent removal of a wheel from the carrier structure, a handle on the front end of said cam hub whereby it may be turned, and lock mechanism within the front end of said cam hub operable to lock said cam hub to said head when said latch pins are in locking position, said hub and said cam and handle being an integral structure.

In testimony whereof I have hereunto subscribed my name at North Chicago, Lake County, Illinois.

FREDERICK A. SMITH.